Figure 1:
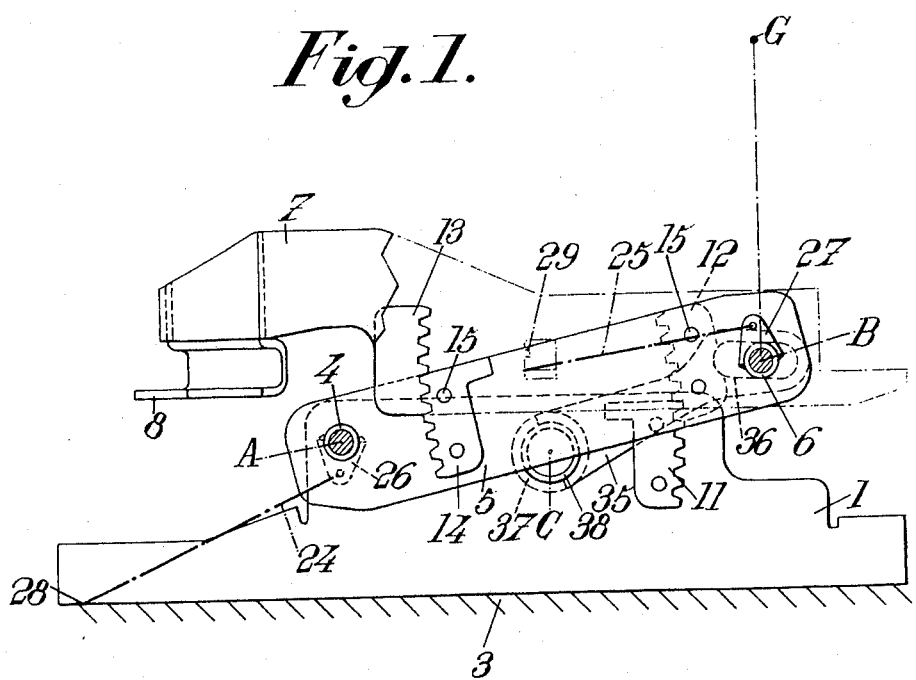

United States Patent [19]
Fourrey et al.

[11] 3,910,543
[45] Oct. 7, 1975

[54] VERTICALLY ADJUSTABLE SEAT SUPPORTS

[75] Inventors: François Fourrey; Yves Pezier, both of Etampes; René Droual, Ris Orangis, all of France

[73] Assignee: Etablissements Bertrand Faure, France

[22] Filed: Oct. 30, 1974

[21] Appl. No.: 519,263

[30] Foreign Application Priority Data
Dec. 5, 1973  France .............................. 73.43463

[52] U.S. Cl. ............................................. 248/396
[51] Int. Cl.² ......................................... B60N 1/02
[58] Field of Search .......... 248/394, 396, 397, 157; 108/1, 4, 6, 9

[56] References Cited
UNITED STATES PATENTS

| | | | |
|---|---|---|---|
| 3,552,707 | 1/1971 | Tanaka .............................. | 248/394 |
| 3,692,271 | 9/1972 | Homier et al. ...................... | 248/394 |
| 3,853,295 | 12/1974 | Christin .............................. | 248/396 |

Primary Examiner—Roy D. Frazier
Assistant Examiner—Robert W. Gibson, Jr.
Attorney, Agent, or Firm—Larson, Taylor and Hinds

[57] ABSTRACT

The support is adjustable vertically in inclination and in height. It has a first lower rigid framework fast to the floor of the vehicle, a second rigid framework mounted pivotably around a horizontal axis connected to the first framework and extending over the width of the seat and a third rigid framework mounted pivotably around a second horizontal axis parallel to the first and connected to the second framework. First locking means actuate the locking and unlocking of the second framework in one or other of a plurality of its different angular positions of pivoting with respect to the first framework around the first axis, and second locking means actuate at will the locking and unlocking of the third framework in one or other of a plurality of its different angular positions of pivoting with respect to the second framework around the second axis. The first locking means are two gear sectors centred on the first axis and adapted to cooperate between themselves on locking, of which sectors one is fast to the first framework and of which the other is mounted on the second framework so as to be movable with respect to the first under the control of a rotary cam. The second locking means are also two gear sectors centred on the second axis and adapted to cooperate between themselves on locking, of which sectors one is fast to the third framework and of which the other is mounted on the second framework so as to be movable with respect to the first under the control of a second rotary cam. The two cams are constantly urged elastically towards their angular positions corresponding to locking, the gear sectors mounted on the second framework being constantly fast to the latter.

9 Claims, 4 Drawing Figures

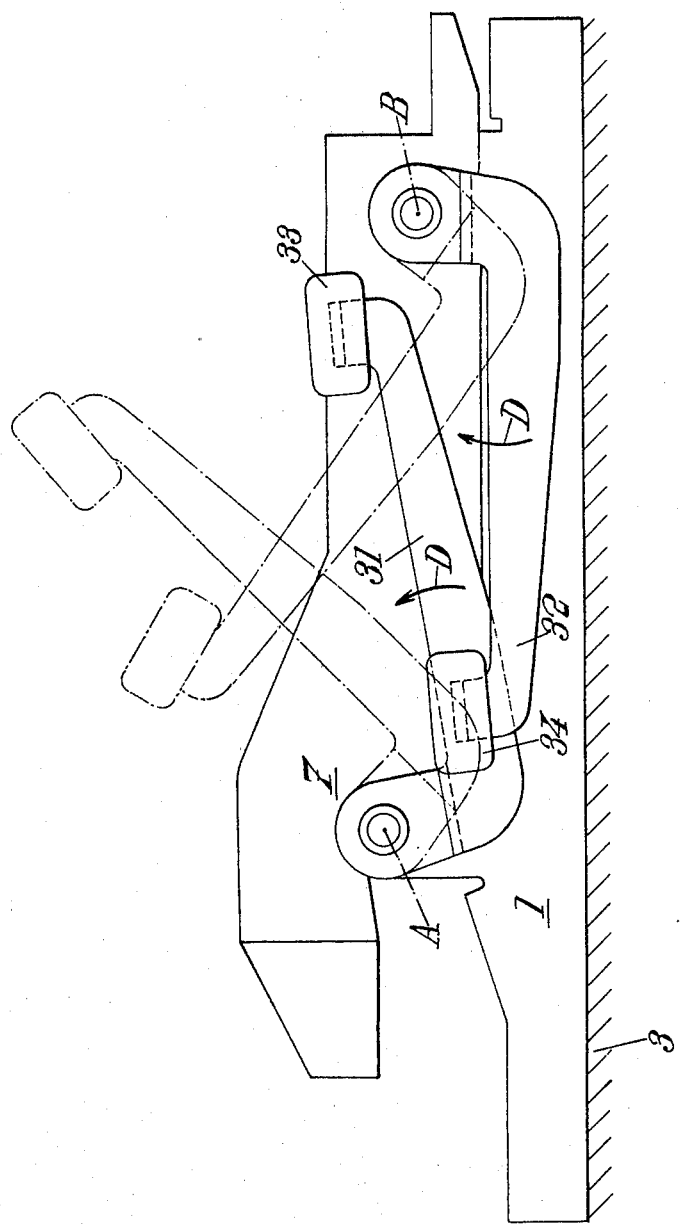

VERTICALLY ADJUSTABLE SEAT SUPPORTS

The invention relates to vehicle seat supports adjustable vertically in inclination and in height, which supports are often called "raising frames" or "adjustable chassis."

It relates more particularly, among these supports, to those comprising a first lower rigid framework fast to the floor of the vehicle, a second rigid framework mounted in pivoting manner around a horizontal axis connected to the first framework and extending over the width of the seat, a third rigid framework mounted in pivoting manner around a second horizontal axis parallel to the first and connected to the second framework, first locking means easily operated by seated person to actuate at will the locking and unlocking of the second framework in one or other of a plurality of its various angular pivoting positions with respect to the first framework around the first axis, and second locking means easily operated by the seated person to actuate at will the locking and unlocking of the third framework in one or other of a plurality of its various angular pivoting positions with respect to the second framework around the second axis.

It relates more particularly again to those supports of the type concerned, in which on the one hand the first locking means comprise two gear sectors centred on the first axis and adapted to cooperate between themselves on locking, of which sectors one is fast to the first framework and the other is mounted on the second framework so as to be displacable with respect to the first under the action of a first rotary cam operable by the seated person and in which supports on the other hand the second locking means comprise also two gear sectors centred on the second axis and adapted to cooperate between themselves on locking, of which sectors one is fast to the third framework and of which the other is mounted on the second framework so as to be displacable with respect to the first under the action of a second rotary cam operable by the seated person, the two cams being elastically urged continuously towards their angular positions corresponding to locking.

Such supports, which give satisfaction for the most part, are previously known.

It is a particular object of the invention to render supports of the type concerned such that they respond to the various exigencies of practice better than hitherto, especially as regards the solidity of their construction and simplicity of their operation.

The said supports according to the invention are essentially characterised in that the gear sectors mounted on the second framework are always fast to the latter and are preferably both oriented in the same forward or rearward direction.

Such an arrangement simplifies the assembly of the gear sectors concerned since it is no longer necessary to make them slidable with respect to the second framework as it was the case in previous constructions.

In preferred embodiments, it is possible to resort in addition to one and/or the other of the following features: the two rotary cams are fast, respectively, the first to a first handle pivotably mounted around the first axis and the second to a second handle pivotably mounted around the second axis and these two handles comprise respectively two arms each terminated by a control knob, which arms each extend horizontally in the direction of the axis of rotation of the other arm thereby crossing this other arm so that finally the release in height of the front and rear ends of the seat are ensured by actuation of the control knobs located respectively most forwards and most rearwards, means are provided for compensating elastically for the weight of the assembly of the seat and of the person sitting on this seat by the application of an upward force on said assembly in the transverse plan which contains its center of gravity when the rear of the support is free vertically, these means comprising: a lever mounted pivotably around a fixed transverse horizontal axis connected to the first framework, of which lever the lower end is supported against an element of the third framework, arranged substantially in the above transverse plan; and a helical torsion spring wound around the axle of the lever and adapted to urge the latter angularly upwards.

The invention comprises, apart from these main features, certain other features which are preferably used at the same time and which will be more explicitly considered below.

In the following a preferred embodiment of the invention will be described with reference to the accompanying drawings given of course by way of non-limiting example.

Figure 2:
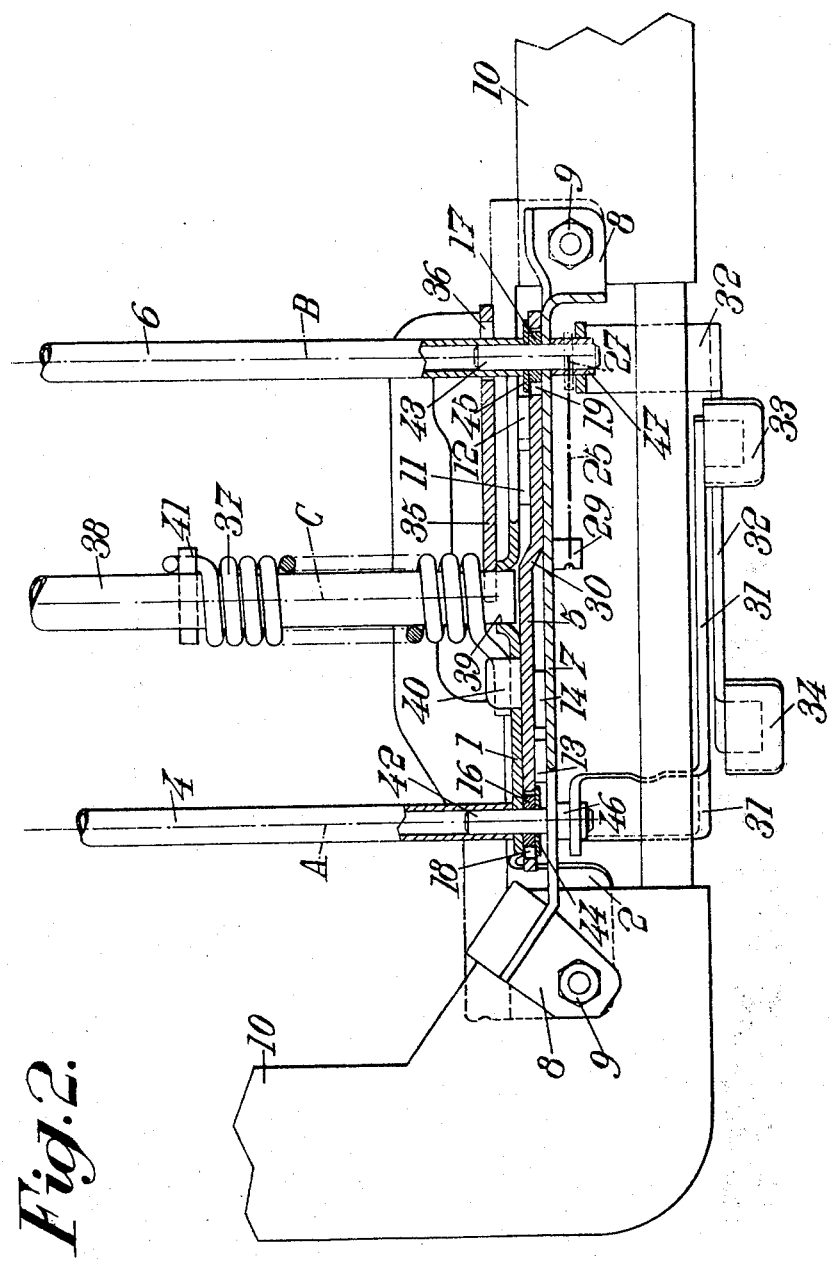

FIGS. 1 and 2, of these drawings, show respectively in side view, with portions removed and in plan view, with portions removed, one embodiment of a seat support constructed according to the invention.

Figure 3:
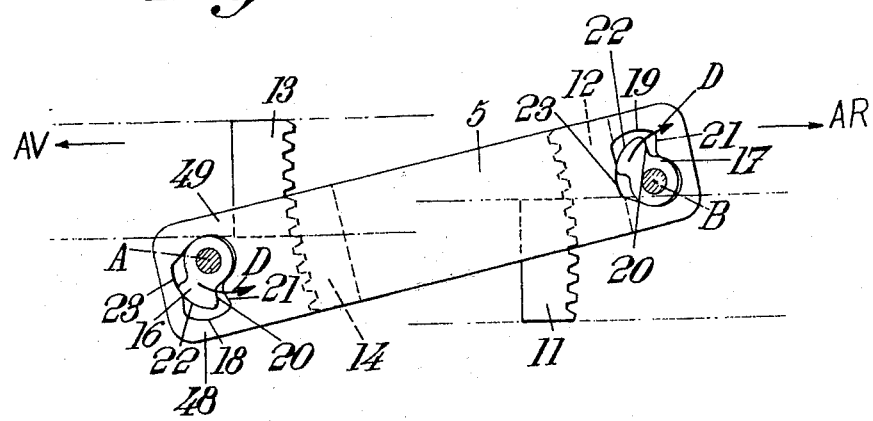

FIG. 3 is another view of the type of that of FIG. 1, showing other details of said support.

And FIG. 4 shows again the same support in side view, but on a larger scale than FIG. 1 and without parts removed.

The support concerned comprises:

a first lower rigid framework fast to the floor of the vehicle, if necessary by means of an adjusting slide for the advance or withdrawal of the seat, a second rigid framework which, for all positions of the support other than its most downward tilted position, is inclined generally upwards and towards the rear of the seat, which framework is mounted pivotably around a front horizontal axis A connected to the first framework and extending over the width of the seat, a third rigid framework mounted pivotably around a horizontal axis B parallel to the axis A and connected to the rear end of the second framework, first means easily operated by the seated person to make the first and second frameworks angularly fast between themselves, in one or other of a plurality of distinct relative angular positions around the axis A, and second means easily operated by the seated person to make the second and third frameworks angularly fast between themselves in one or other of a plurality of distinct relative angular positions around the axis B.

The first framework comprises two vertical end plates 1 extending longitudinally on each side of the seat, which end plates are extended below by horizontal lugs 2 fixed to the floor 3 of the vehicle, for example through longitudinal adjustment slides (not shown). These two end plates are spanned transversely by a connecting bar 4 with axis A pivotably mounted on these two end plates 1.

The second framework is essentially constituted by two vertical plates 5 also extending longitudinally on each side of the seat and both traversed by the above bar 4 as well as by another connecting bar 6 with axis B.

Lastly the third framework comprises two vertical end plates 7 again extending longitudinally on each side of the seat; these end plates are spanned by the bar 6 which is mounted pivotably on them and they are extended by horizontal lugs 8 on which is fixed, for example by screwing at 9, the framework 10 of the seating of the seat.

The first locking means comprise, on each side of the seat, two gear sectors 11 and 12 centred on the axis A, of which sectors the teeth are in engagement on locking and of which one 11 is fast to one end plate 1 whilst the other 12 is mounted on a plate 5, and the second locking means comprise two gear sectors 13 and 14 centred on the axis B, of which sectors the teeth are in engagement on locking and of which one 13 is fast to one plate 7 whilst the other 14 is mounted on the above plate 5.

The gear sectors 12 and 14 are fast to plate 5, being fixed to this plate, for example by means of rivets 15 or by welding.

Moreover, instead of being oriented in reverse directions, they are oriented in the same direction, for example both directing their teeth forwardly.

To avoid the forces supported by the teeth of these sectors from being too high in blocking position, the corresponding lever arms are given relatively high values, the two sectors 11 and 12 whose teeth are centered on the axis A being relatively close to the axis B and the two sectors 13 and 14 of which the sectors are centred on the axis B being relatively close to the axis A.

So that each foldable Z constituted by an end plate 1, a plate 5 and an end plate 7 may be completely flattened in the most downward adjusted position of the support, the two gear sectors 12 and 14 of each plate are fixed respectively to the two opposite faces of the latter, and to reduce as much as possible the transverse bulk of this Z, the central zone 30 (FIG. 2) of each plate 5 is slightly deformed so as to offset one with respect to the other by the thickness of a gear sector the parallel middle plans of the two halves of this plate.

The unlocking is effected by cams 16 and 17 rotably mounted around axis A and B and respectively fast to the bars 4 and 6, which cams are adapted to cooperate respectively with the inner edges, forming countercams, of apertures 18 and 19 formed in the plate 5.

The rotation of these cams corresponding to unlocking (along the arrows D in FIG. 3) actuate:

for the cam 16, movements of the whole of the second framework, of the third framework and of the seat supported by the latter with respect to the first framework, fixed, and this rearwardly in the case of FIG. 3 (arrow AR), and for the cam 17, the movements of the whole of the third framework and of the seat supported by the latter with respect to the second framework, then fixed, and this forwardly in the case of FIG. 3 (arrow AV) for the reason mentioned below.

In both cases of unlocking, and due to the fact that the two gear sectors 12 and 14 mounted on the same plate are both oriented forwardly, unlocking requires a relative displacement of the sector concerned (12 or 14) rearwardly, and it is indeed in this direction that each of the two cams 16 and 17 urges the plate on unlocking.

But if this urging is manifested in fact by a movement of the sector 12, of the plate 5 and all that it supports rearwardly in the case of the cam 16, which pivots around the firmly fixed axis A, it is not the same in the case of the cam 17: in this case in fact, it is the plate 5, and hence the aperture 19 against which said cam 17 is supported, which are firmly fixed, and the axis B is hence obliged by reaction to move forwards so as to space the sector 13 from the sector 14, which remains motionless.

Finally, the two sectors which are moved to ensure the two unlockings are the two sectors 12 and 13, the sector 11 always remaining strictly fixed and the sector 14 only moving with the sector 13 in engagement with it.

Each cam comprises a rectilinear section 20 passing through the axis (A or B) of the cam and adapted to cooperate, during the course of unlocking, with a section 21, of the edge of the corresponding aperture, extending in a substantially vertical direction (that is to say having at least one vertical component), these two sections then mutually pushing themselves, without practically sliding along each other, in a substantially horizontal direction.

Each cam comprises in addition a circular area 22 adapted to cooperate at the end of locking with a circular area 23 of the edge of the corresponding aperture by sliding against the latter in a substantially vertical direction. The two circular areas 22 and 23 are preferably slightly eccentric so that their relative sliding exerts a wedging effect which enhances the reliability of locking.

It is to be noted that, due to this design of the cams and of their apertures, the stresses capable of being exerted horizontally on each locked cam, for example due to the fact of the load on the other cam, is manifested simply by a radial application of this cam on its axis, and never by urging this cam into pivoting, so that locking is quite positive.

Each cam is here urged angularly to its unlocking position by a tension spring (24, FIG. 1, for the cam 16; 25 for the cam 17) stressed between an eccentric lug (26; 27) fast to this cam and a lock stop, such as a punched lug or the edge of a hole (28; 29) provided in the corresponding side plate (1; 7).

Each of the apertures 18 and 19 is here well centered in the width of the plate 5, so as not to weaken one side of this aperture more than the other and thus to preserve on each side of this aperture (above and below it) plate sections 48 and 49 of comparable thicknesses.

As moreover, the cams and their apertures are vertically eccentric with respect to the axis A and B, it follows necessarily that these axis are no longer exactly located at the middle of the width of the plate.

It is to be noted that, in the embodiment which has just been described, the rotation of the cam 16 around the front axis A releases the rear end of the seating portion in height and that on the other hand the rotation of the cam 17 around the rear axis B releases the front end of the seating in height.

The operation of these cams by means of handles fast to the latter would hence risk confusing the user in view of the fact that it is not instinctive to actuate the rear cam to unlock the front of the seat and reciprocally.

To avoid such confusion and to render the operation of the cams on the contrary instinctive, according to an advantageous feature of the invention, the operating members of these cams are arranged in a manner of two lever arms 31 and 32 extending horizontally so as to intersect, said arms being terminated respectively by two actuating knobs 33 and 34 easily accessible to the user of the seat.

Thus the most rearwardly located knob 33 corresponds to actuation of the pivoting cam 16 around the front axis A, which actuation permits the release in height of the rear of the seat, whilst the forward most located knob 34 corresponds to actuation of the pivoting cam 17 around the rear axis B, which actuation permits release in height of the front of the seat.

In the case of the figures, it is seen that, to actuate each cam (16, 17) in the direction of unlocking (direction of the arrows D of FIGS. 3 and 4) it is necessary to lift the corresponding knob (33, 34), to wit the front knob to release and adjust the height of the front of the seat and the rear knob to release and adjust the height of the rear of the seat.

Each of the arms 31 and 32 is advantageously constituted by a plate cut out into an L and folded into a Z at right angles.

When the front end of the seat is released in height by lifting the front knob 34, the height adjustment of this end is done simply by tilting the seat around the rear axis B: this tilting is in fact very easy to carry out, by adjustment of the horizontal supporting pressure of the back of the person seated against the back of the seat, due to the fact that the center of gravity G of the whole constituted by the seat and this person is substantially vertically over said axis B.

But when it is the rear end of the seat which is released in height by lifting the rear knob 33 in order to enable adjustment of the height of the end around the front axis A, said end would run the risk of sinking downward and falling into its lowest position if special means were not provided to compensate for the weight of the seat-user assembly, applied substantially vertically over the axis B.

Such compensating means are constituted, according to an advantageous feature of the invention, by at least one rod 35 pivotably mounted around a transverse horizontal axis C (FIGS. 1 and 2), which rod has at its free end a horizontal slot 36 straddling edge to edge the bar 6, and by a strong torsion spring 37 angularly urging said rod in the direction which tends to lift the bar 6.

Said rod 35 is fast to a shaft 38 with axis C pivotably mounted in two circular holes 39 formed respectively in the two end plates 1 of a support so as to provide collars in these end plates.

The torsion spring 37 is wound around this shaft 38, one of its ends being supported against a punched lug 40 in one end plate 1 and its other end being supported against a pin 41 traversing the shaft 38 diametrically.

In the preferred embodiment, and to avoid any cantilever action, the rods 35 are two in number, arranged respectively on each side of the seat.

It is also seen in FIG. 2 that each of the linking bars 4 and 6 is constituted by a section of metallic tube in one end of which is force fitted a cylindrical end piece (respectively 42, 43) itself introduced edge to edge into a complementary hole of the end plate (1 for the end piece 42; 7 for the end piece 43) and fast in rotation successively with the corresponding cam (16, 17), with a stop washer (44, 45) juxtaposed against the surface, of this cam, opposite said end plate (this washer and this end plate holding the cam in its aperture) and with a terminal ring (46, 47) itself connected, for example by welding, to the corresponding handle (31, 32).

Generally the mechanism which has been described above is duplicated on each side of the seat, with the exception of the actuating handles, which are provided on one side only of the seat: connecting bars 4 and 6 enable the solidarization between themselves, the first, of the two cams 16 and the second, of the two cams 17.

The common orientation forwardly of the teeth of the two gear sectors 12 and 14 fast to each plate 5 has the following advantage, due to the fact that these plates drop forwardly or, in other words, due to the fact that the lower axis A is located to the front: the weight of the seat and of the passenger supported by this seat is transmitted from the upper framework to the lower framework through the two said plates, which has the tendency to push these plates towards the lower axis A and hence to push the teeth of the sectors 12 and 14 into those of sectors 11 and 13 with which they are in engagement, thus reinforcing the reliability of locking of the mechanism in its locked position.

Of course, if the lower axis were the rear axis of the mechanism, the same advantage would be obtained by orienting the teeth of the two gear sectors borne by each intermediate plate rearwardly.

Opposite orientations of the two sets of gear teeth concerned could also be envisaged.

As a result of which, and whatever the embodiment adopted, there is finally obtained a seat support which has numerous advantages with respect to those previously known, for example as regards robustness, simplicity of construction, ease and instinctive nature of adjustment.

As is self-evident, and as emerges already from the foregoing, the invention is in no way limited to those of its types of application and embodiments which have been more especially envisaged; it encompasses, on the contrary, all modifications.

We claim:

1. Vehicle seat support adjustable vertically in inclination and in height, comprising a first lower rigid framework fast to the floor of the vehicle, a second rigid framework mounted pivotably around a horizontal axis connected to the first framework and extending over the width of the seat, a third rigid framework mounted pivotably around a second horizontal axis parallel to the first and connected to the second framework, first locking means easily operable by the seated person to actuate at will the locking and unlocking of the second framework in one or other of a plurality of its different angular positions of pivoting with respect to the first framework around the first axis, and second locking means easily operable by the seated person to actuate at will the locking and unlocking of the third framework in one or other of a plurality of its different angular positions of pivoting with respect to the second framework around the second axis, the first locking means comprising first and second gear sectors centered on the first axis and adapted to cooperate between themselves on locking, of which the first sector is fixed to the first framework and of which the second sector is mounted on the second framework so as to be movable with respect to the first sector under the control of a rotary cam operable by the seated person and the second locking means comprising third and fourth gear sectors centered on the second axis and adapted to cooperate between themselves on locking, of which the third sector is fixed to the third framework and of which the fourth sector is mounted on the second framework so as to be movable with respect to the third sector under the control of a second rotary cam operable by the seated person, the two cams being constantly urged elastically towards their angular positions corresponding to locking, the gear sectors mounted on the second framework being permanently fixed to the second framework.

2. Seat support according to claim 1, wherein the two gear sectors mounted on the second framework are oriented in the same front or rear direction.

3. Seat support according to claim 1 in which the second framework comprises two plates extending respectively from the two sides of the seat, the two gear sectors being fixed respectively to the two opposite surfaces of a same plate.

4. Seat support according to claim 3, wherein the central zone of said plate is slightly deformed so as to offset the parallel middle planes of the two halves of this plate with respect to one another, by the thickness of a gear sector.

5. Seat support according to claim 1, in which the second framework comprises two plates extending respectively from both sides of the seat, and in which each rotary cam is housed in an opening of a plate, whose edges form a countercam, said opening being centered in the width of the plate so as to leave on both sides of this opening, plate sections of substantially equal thicknesses.

6. Seat support according to claim 1, wherein the two rotary cams are respectively fixed, the first to a first handle pivotably mounted around the first axis and the second to a second handle pivotably mounted around the second axis and in that the two handles comprise respectively two arms each terminated by a control knob which arms each extend horizontally in the direction of the axis of rotation of the other arm by intersecting this other arm so that finally the release in height of the front and rear ends of the seat is ensured by actuation of the control knobs located respectively most forwards and most rearwards.

7. Seat support according to claim 6, wherein each constituent arm of a handle is formed by a plate cut out in an L and folded along a right angled Z.

8. Seat support according to claim 1, in which means are provided for compensating elastically the weight of the assembly of the seat and of the person seated on this seat by the application of an upward force on said assembly in the transverse plane which contains its centre of gravity, when the rear of the support is released vertically, said means comprising: a lever pivotably mounted around a fixed transverse horizontal axis connected to the first framework, of which lever the end is supported at the lower part against an element, of the third framework, arranged substantially in the above transverse plane; and a helicoidal torsion spring wound around the axis of the lever and adapted to urge the latter angularly upwards.

9. Seat support according to claim 8, wherein the free end of the lever comprises a horizontal slot straddling contiguously a bar centered on the second axis and forming part of the third framework.

* * * * *